United States Patent [19]
Rose et al.

[11] Patent Number: 6,092,433
[45] Date of Patent: Jul. 25, 2000

[54] SMALL ENVELOPE RANGE PISTON HOUSING FOR ELECTRICAL TRANSMISSION RANGE SHIFT SYSTEM

[75] Inventors: Jonathan S. Rose, Laurinburg; Kenneth T. Picone, Pinehurst; Peggy Marie Garrett, Laurinburg, all of N.C.

[73] Assignee: ZF Meritor, L.L.C., Laurinburg, N.C.

[21] Appl. No.: 09/093,760

[22] Filed: Jun. 9, 1998

[51] Int. Cl.[7] .................................................. F16H 61/30
[52] U.S. Cl. ........................... 74/335; 74/745; 74/606 R
[58] Field of Search ........................ 74/745, 335, 336 R, 74/606 R; 180/365

[56] References Cited

U.S. PATENT DOCUMENTS

| | | | |
|---|---|---|---|
| 3,648,546 | 3/1972 | McNamara et al. | 74/745 |
| 3,939,722 | 2/1976 | Stromberg | 74/745 X |
| 4,388,843 | 6/1983 | Teeter | 74/745 |
| 4,876,924 | 10/1989 | Fletcher et al. | 74/745 |
| 5,038,627 | 8/1991 | Schwaiger et al. | 74/335 |
| 5,092,187 | 3/1992 | Irwin | 74/745 X |
| 5,144,863 | 9/1992 | Wood | 74/745 |
| 5,218,878 | 6/1993 | Monette et al. | 74/745 X |
| 5,361,650 | 11/1994 | Klecker et al. | 74/606 R |
| 5,743,143 | 4/1998 | Carpenter et al. | 74/335 |
| 5,791,189 | 8/1998 | Newbigging | 74/745 X |
| 5,845,544 | 12/1998 | Huggins et al. | 74/606 R |
| 5,845,545 | 12/1998 | Braun et al. | 74/606 R |

*Primary Examiner*—Charles A. Marmor
*Assistant Examiner*—Ankur Parekh
*Attorney, Agent, or Firm*—Howard & Howard

[57] ABSTRACT

A vehicle transmission assembly includes a main gear box that supports an auxiliary gear box assembly, such as a range gear box. The main gear box has a shaft that is coupled to a shaft of the range gear box assembly. The range gear box assembly includes selectively engageable range gears, a shifting assembly, and a range piston assembly. The range piston assembly includes a single piece housing, an air filter regulator, and a range position sensor. The sensor monitors range selection of the range gears and produces a range position signal that is sent to an electronic control unit. The air regulator is threadably attached to the single piece housing and provides air to a pneumatic piston that resides in the housing. The pneumatic piston is used to control the positioning of the range gears.

13 Claims, 5 Drawing Sheets

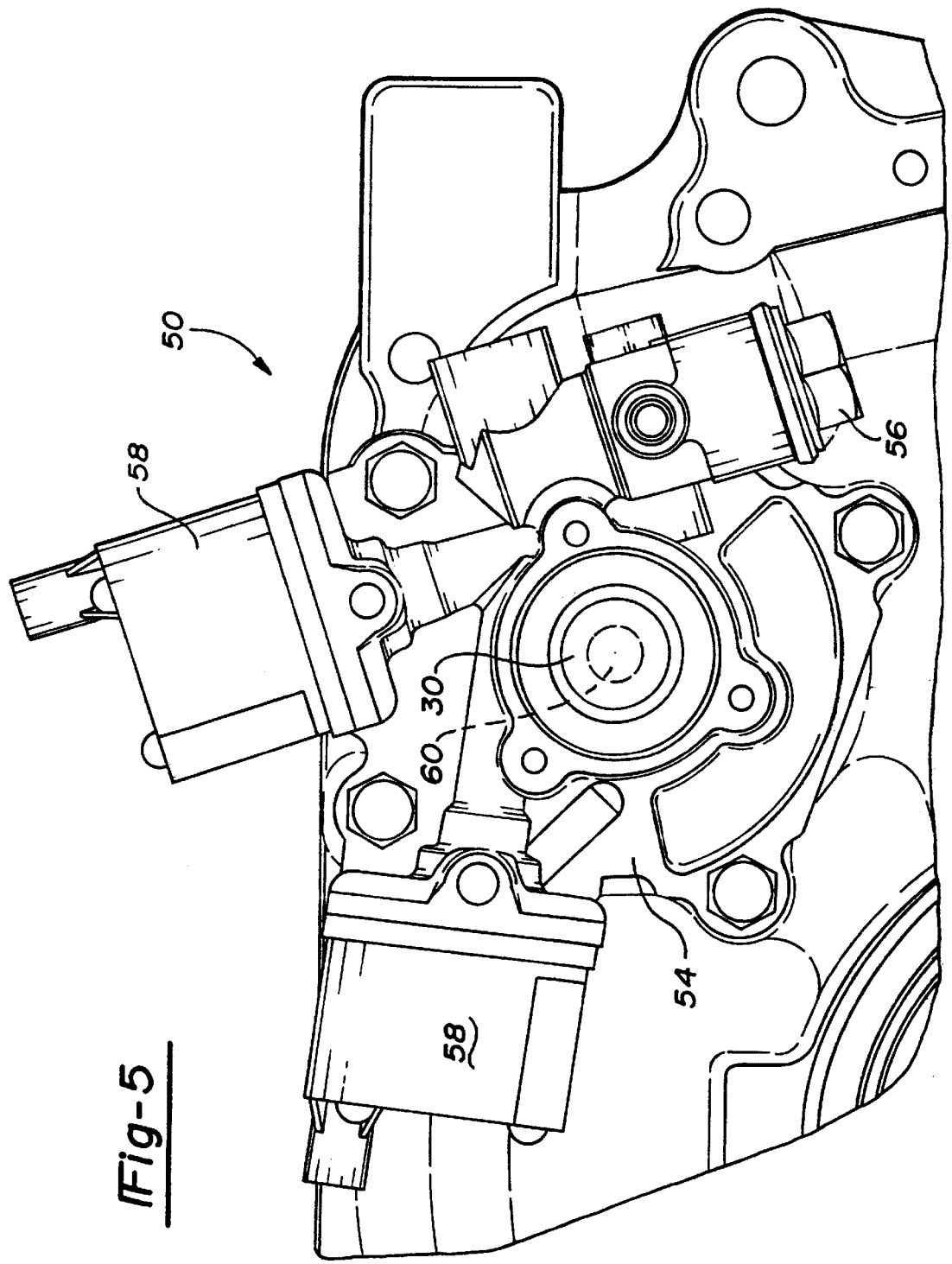

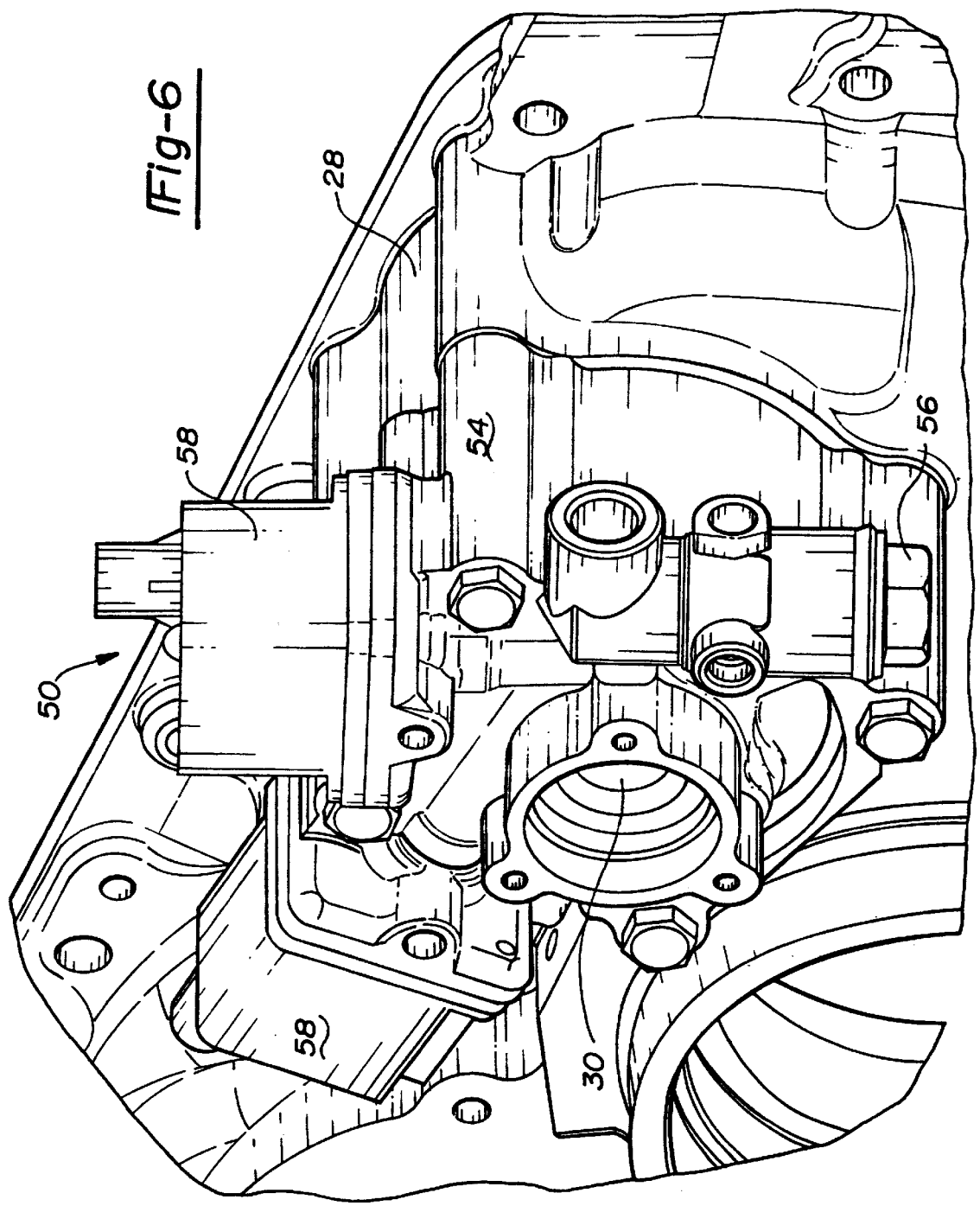

SMALL ENVELOPE RANGE PISTON HOUSING FOR ELECTRICAL TRANSMISSION RANGE SHIFT SYSTEM

BACKGROUND OF THE INVENTION

This invention relates to a unique auxiliary gear box configuration incorporated onto a vehicle transmission assembly.

Heavy duty vehicle transmissions typically provide the ability to engage a large number of gear ratios for driving the vehicle. Usually, a main transmission gear box houses a number of gears that are selectively engaged to achieve a particular gear ratio for optimal vehicle performance. An auxiliary or range gear box is often additionally provided to increase the number of available gear ratios. The range gear box typically includes one or more range gears that are selectively engaged by pneumatics to operate the transmission in one of several ranges. Usually the range gear box includes a low range and a high range. For example, the low range is typically associated with the lower gears in the transmission such as first through fifth gear. When the range gear box is shifted into the high range, then the same gears in the transmission main gear box that were used for first through fifth gear are now used for sixth through tenth gear.

Range gear box assemblies are typically bolted onto a transmission main gear box housing. A shaft from the main gear box is coupled to a shaft for the range gear box. Typical range gear box configurations include a range gear box housing, range gears, a piston, solenoids, a range piston housing, and an air regulator.

The air regulator receives air from the vehicle and the solenoids direct the air from the regulator to either of two sides of the piston. The piston controls the selection of the desired range gear. The air regulator and the solenoids are usually bolted onto a mounting bracket which attaches to a housing cover. The solenoids are typically attached to the mounting bracket such that they are located between the range piston housing and the air regulator. The housing cover and range piston housing are attached to the range gear box housing by bolts or screws.

A range piston housing configuration such as this is difficult to package due to the limited space available in the vehicle. Bolting the air regulator to the mounting bracket and orientating it so that it is spaced apart from and in a vertical relationship to the range piston housing takes up a significant amount of room. Also, mounting the solenoids to the bracket so that they are located between the air regulator and the range piston housing takes up valuable space. Additionally, as vehicles move toward using electronic transmission shift systems it is important to be able to monitor the position of the range gears in the range box housing. Current range piston housing configurations make it extremely difficult to package sensors to monitor range selection due to the limited space available.

Thus, it is desirable to have an effective range piston housing assembly that is compact, reduces cost, and reduces the number of parts necessary for the assembly. It would further be desirable to mount a range position sensor to the range piston housing to monitor range gear position for an electronic transmission shift system.

SUMMARY OF THE INVENTION

A unique vehicle transmission assembly includes an auxiliary gear box assembly that is coupled to a main gear box of the transmission assembly. The auxiliary gear box assembly includes auxiliary gears which operate in conjunction with gears in the main gear box to provide a variety of operable transmission ranges. The auxiliary gear box assembly includes an air regulator that is supported by a single piece housing. The configuration of the air regulator on the housing provides significantly improved packaging which increases available space for other components.

In the preferred embodiment, the vehicle transmission assembly includes a main gear box with a first shaft. An auxiliary gear box has a second shaft that is coupled to the first shaft. The second shaft is operably connected to auxiliary gears. A shifting assembly is used to shift the auxiliary gears. A range piston housing is supported on the auxiliary gear box. An air regulator is connected to the range piston housing for supplying air to drive the shifting assembly.

In a further embodiment, the auxiliary gear box assembly is preferably a range gear box and the auxiliary gears are range gears. A sensor is used to monitor range selection of the range gears and produces a range position signal that is sent to an electronic control unit.

In an alternate embodiment, the auxiliary gear box assembly includes a range piston housing comprised of a single piece housing supported by a vehicle transmission assembly. The auxiliary gear box has selectively engageable auxiliary gears that are operably associated with the vehicle transmission assembly. An air regulator is attached to the housing and provides air to a shifting assembly for shifting the auxiliary gears. The gear box assembly also includes a sensor that monitors range selection of the auxiliary gears.

By mounting the sensor directly to the housing, the present invention can easily and efficiently monitor the range selection of the range gears. Moreover, the system is compact and reduces the number of required parts necessary to previous systems, which results in improved packaging and beneficial cost savings.

These and other features can be understood from the following specification and drawings.

BRIEF DESCRIPTION OF THE DRAWINGS

FIG. 5 is an end view of the assembly shown in FIG. 3; and

FIG. 6 is a perspective view of and opposite side of the assembly shown in FIG. 3.

DETAILED DESCRIPTION OF THE PREFERRED EMBODIMENT

Figure 1:
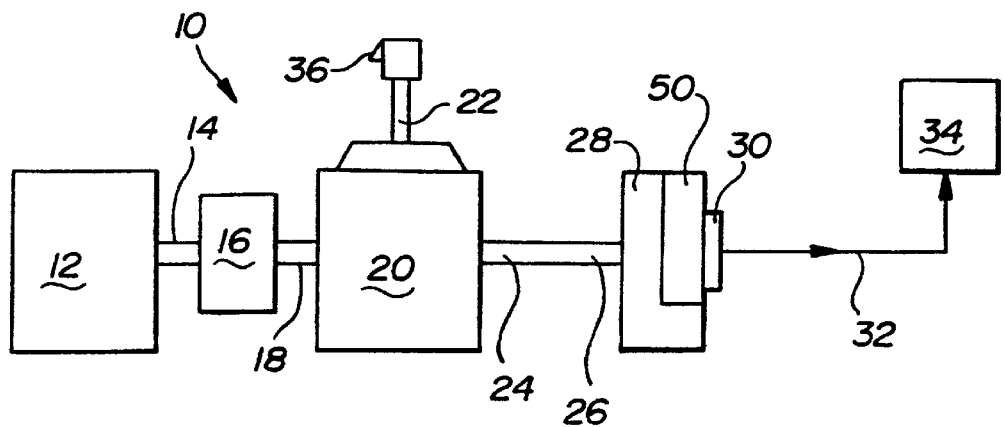
FIG. 1 is schematic illustration of a transmission system.

FIG. 1 schematically illustrates a transmission assembly 10 for use in a vehicle. An engine 12 has an output shaft 14 that is selectively coupled through a clutch 16 to an input shaft 18 of a transmission main gear box 20. The transmission main gear box 20 can be any conventional transmission gear box. A shift lever 22 allows an operator to selectively engage gears within the main gear box 20. In the preferred embodiment, the shift lever 22 is a manual stick shift lever. It should be noted, however, that a shift arrangement where a driver moves a shift lever to generate signals indicative of a desired gear change could also be used. Further, automated or automatic transmissions may also benefit from this invention.

A first shaft 24 from the transmission main gear box 20 is coupled to a second shaft 26 that is located in an auxiliary gear box assembly 28. The auxiliary gear box assembly 28 is preferably a range gear box assembly 28 that provides the ability to operate the vehicle transmission assembly 10 in a high or low range, for example. Alternatively, a splitter-type auxiliary gear box may also benefit from this invention.

The range gear box assembly 28 of the subject invention includes a range piston housing 50 and a sensor 30 which monitors whether the vehicle transmission assembly 10 is operating in high or low range. The sensor produces a range selection signal 32 which is transmitted to a electronic control unit 34.

The transmission assembly 10 includes an electrical actuation device that effects the gear changes within the range gear box 28. The shift lever 22 preferably includes a range switch 36 that allows the driver of the vehicle to indicate when a range shift is desired. The range switch 36 preferably is configured so that the driver can specify whether the range gear box 28 should shift into the high or low range. Alternatively, the range shift selection can be performed automatically depending on the ratio selected by the driver.

Figure 2:
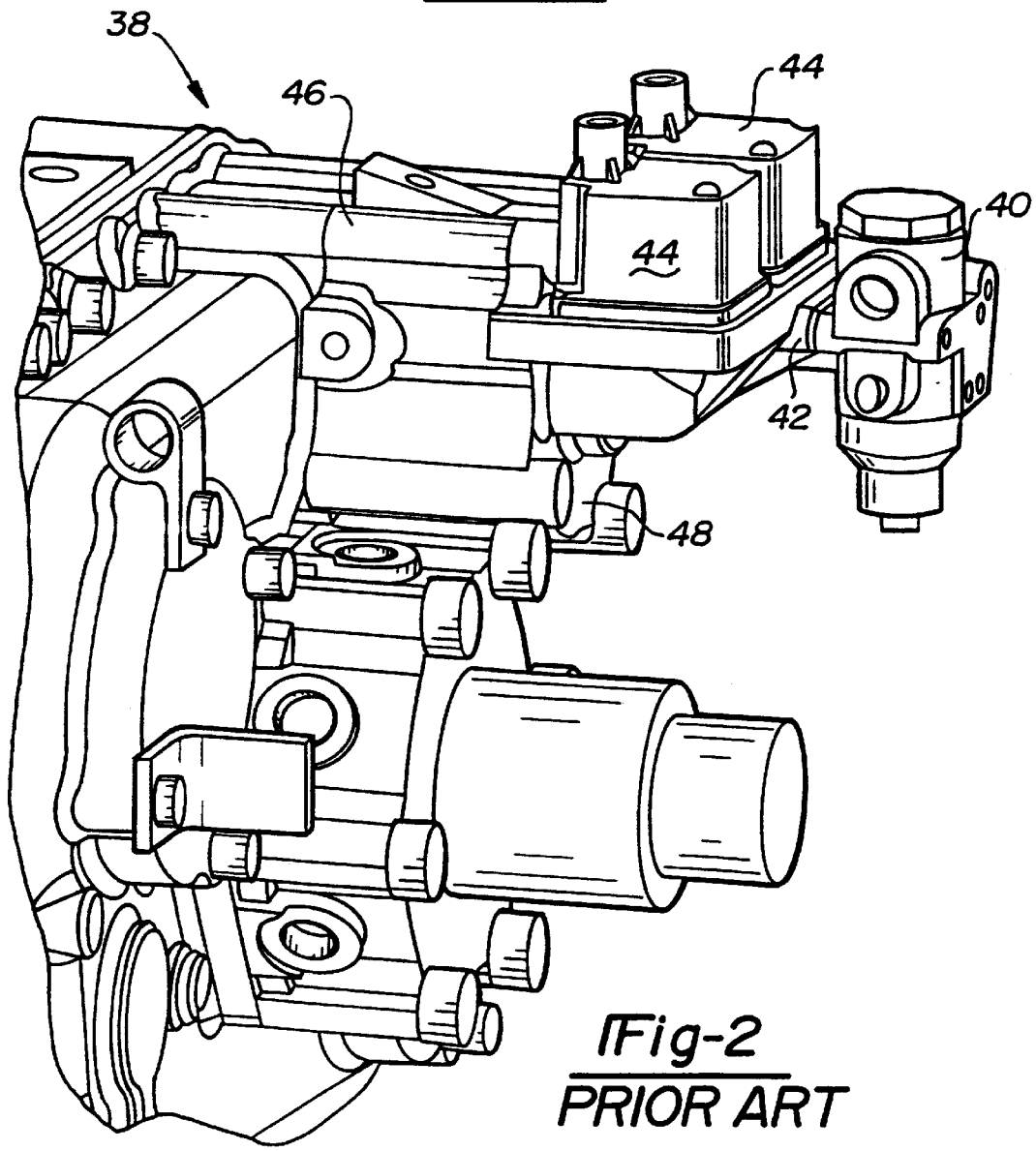
FIG. 2 is a perspective view of a prior art system.

FIG. 2 illustrates a prior art range gear box assembly, generally shown at 38. The range gear box assembly 38 includes an air filter regulator 40, a mounting bracket portion 42, a pair of solenoids 44, a range piston housing 46, and a cover portion 48. As shown in FIG. 2, the mounting bracket portion 42 and the cover portion 48 are formed as a single piece. The cover portion 48 encloses an end of the range piston housing 46 by being bolted to the housing 46 with fasteners.

The mounting bracket portion 42 extends outwardly from the cover portion 48. The air regulator 40 is bolted to the mounting bracket 42 such that the air filter regulator 40 is spaced apart from the range piston housing 46. The solenoids 44 are also mounted to the bracket portion 42 and are located between the air regulator 40 and the range piston housing 46. The bracket portion 42 is integral with the cover 48 and the cover 48 is fastened to the range piston housing 46. As can be seen, with the air filter regulator 40 being mounted distally from the range piston housing 46, a good deal of space is required for this arrangement.

Figure 3:
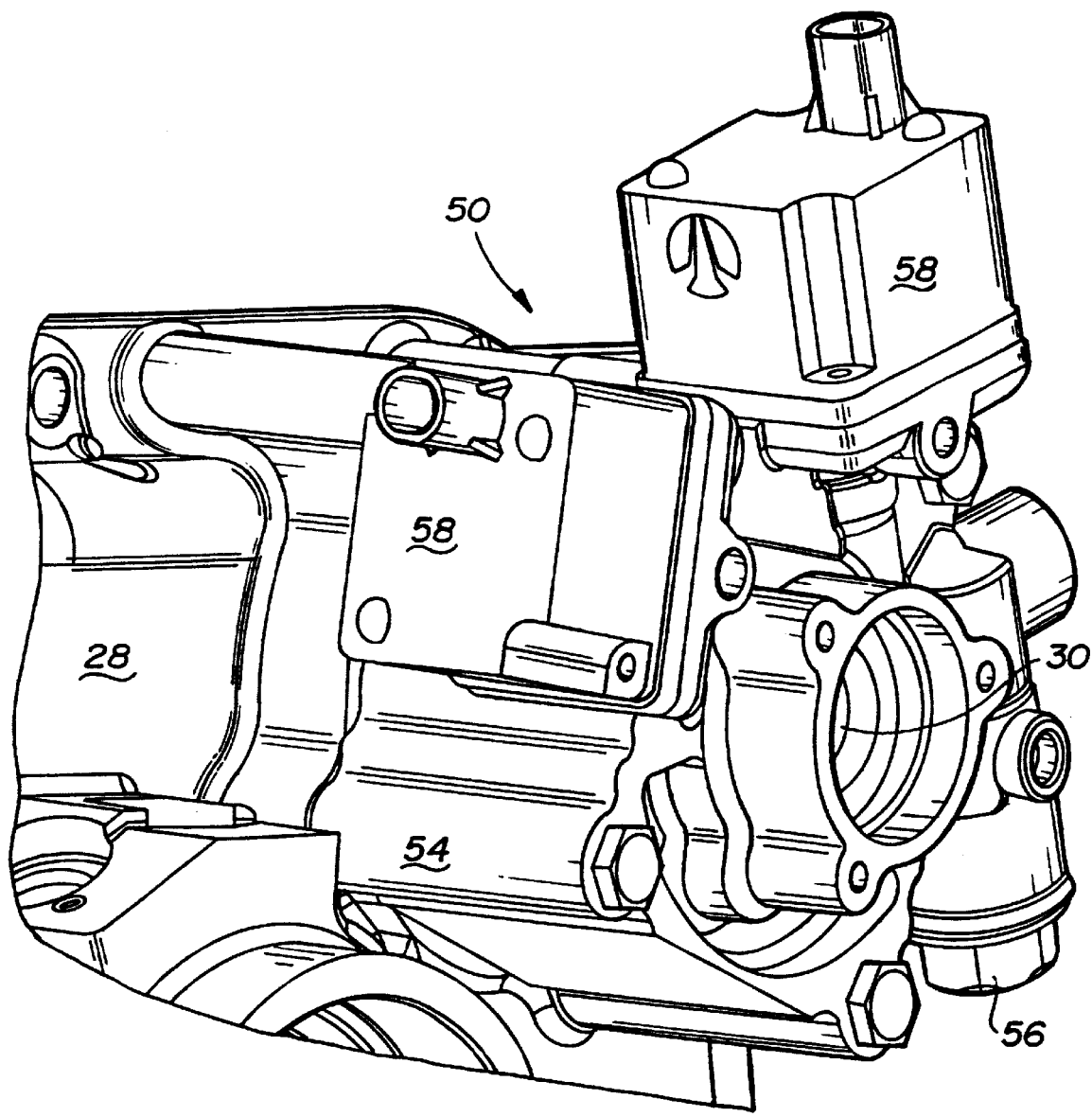
FIG. 3 is a perspective view of the inventive assembly.

FIG. 3 shows the inventive range piston housing assembly 50. The range piston housing assembly 50 includes a single piece housing 54, a cartridge type air regulator 56, at least one solenoid 58, and the range position sensor 30. The range piston housing assembly 50 preferably includes two (2) solenoids. As previously discussed in reference to FIG. 1, the first shaft 24 from the transmission main gear box 20 is coupled to the second shaft 26 located in the range gear box assembly 28.

The air filter regulator 56 is supported directly on the single piece housing 54. The air regulator 56 receives air from the vehicle in the approximate range of sixty (60) to one hundred and twenty (120) pounds per square inch (psi) which covers a pressure difference of sixty (60) psi. The air regulator 56 regulates the air pressure to a more controlled pressure difference of approximately ten (10) psi, however, higher or lower pressure differences can be used. Preferably the pressure range is controlled between sixty (60) and seventy (70) psi. The operation of the air regulator 56 will be discussed in more detail below.

The air regulator 56 is preferably installed onto the housing 54 forming a compact assembly. A range shift shaft 60, shown in FIG. 5, is located inside the range piston housing 46. When the range shift shaft 60 is actuated it causes a shifting assembly in the range gear box assembly 38 to shift into a desired gear. This allows for improved packaging and increases the amount of space available for other components, such as sensor 30.

Sensor 30 is preferably mounted directly to the housing 54 and monitors the range selection of the range gear box assembly 28. The sensor 30 can be any of various sensors well known in the art. The sensor 30 can be located anywhere on the housing 54 but in its preferred embodiment, the sensor is concentric with the shift shaft 60 of the range piston housing 50.

At least one solenoid 58 is mounted directly to the housing 54. In the preferred embodiment, a pair of solenoids 58 are fastened to the housing 54, however, it should be understood that more or less than two solenoids 58 could be used. This arrangement provides a very efficient use of space for the range piston housing assembly 50 and greatly reduces the amount of space used by the housing assembly 50 when compared to prior art assemblies.

Figure 4:
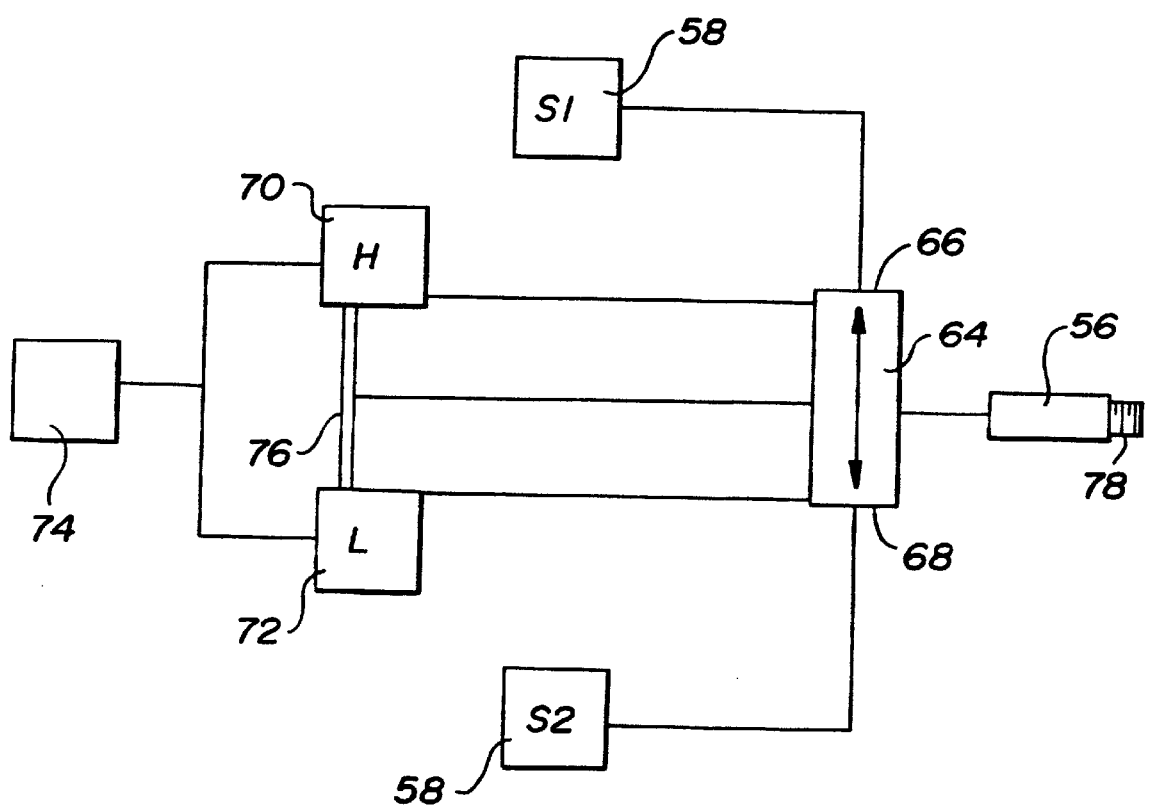
FIG. 4 is a schematic view representing the operation of the auxiliary gear box assembly.

FIG. 4 illustrates a schematic view of the operation of the air regulator 56 in conjunction with the range gear box assembly 28 and main gear box 20. A piston 64 is located inside of the housing 54 and has a first side 66 and a second side 68. The air regulator 56 supplies air to the piston 64. The solenoids 58 control the movement of the piston 64 by directing air to either the first 66 or second 68 side of the piston 64.

The shifting of the piston 64 controls the shifting of the auxiliary or range gears, a high (H) gear 70 and a low (L) gear 72 for example. A shifting element 76, such as a shift fork for example, is used to engage the appropriate gear 70 or 72. Thus, when the solenoids 58 activate the piston 64, causing it to move back and forth as represented by the double arrow in FIG. 4, either the high gear 70 or low gear 72 of the range gear box assembly 28 is selected depending on the operator's input. If the low gear 72 is selected, then gears 74 in the transmission main gear box 20 operate in the low range, such as first through fifth gear for example. When the piston 64 actuates the high gear 70, the range gear box 28 is shifted into the high range and the same gears 74 in the main gear box 20 that were used for the first through fifth gears are now used for the sixth through tenth gears, for example.

The sensor 30 monitors the range selection of the range gears, such as the high 70 or low 72 gear, and produces the range selection signal 32 which is sent to the ECU 34 (FIG. 1). This monitoring is required for electronic transmission shift systems, such as when the driver moves a shift lever to generate signals indicative of a desired gear change, to ensure that proper gear engagement is initiated so that the vehicle is operating under optimal conditions.

The range piston housing assembly 50 of the subject invention, shown in FIG. 5, is configured such that the additional sensor component 30 can be mounted directly to the housing 54. By eliminating the mounting bracket 42 and cover 48 portions, there is room available for the sensor 30. Preferably, the air regulator 56 is mounted to one side of the sensor 30, which allows the sensor 30 to be located concentrically with the shift shaft 60.

As shown in FIG. 6, the available packaging space is greatly increase over prior art designs. This is accomplished by incorporating the air regulator 56 directly into the housing 54. Preferably, the air regulator 56 is threaded 78 onto the housing such that a cartridge style air regulator 56 is provided, which is easily accessed and easily maintained.

Also, the air regulator 56 is re-orientated to provide additional room for other components such as the sensor 30.

Due to packaging constraints mainly caused by the orientation of the solenoids and the air regulator, this sensor 30 could not be included on previous range gear box assemblies, such as the one shown in FIG. 2. Also, the range piston housing assembly 50 eliminates costly parts such as the housing cover portion 48, the mounting bracket portion 42, and the fasteners for the air filter regulator 40, which decreases the overall cost of the assembly.

Thus, the subject invention provides an effective range piston housing assembly 50 that is compact, reduces cost, and reduces the number of parts necessary for the assembly 28 so that a range position sensor 30 can be mounted to the range gear box housing 58.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A vehicle transmission assembly comprising:

a main gearbox having a first shaft;

an auxiliary gearbox having a second shaft coupled to said first shaft;

auxiliary gears operably associated with said second shaft;

a shifting assembly for shifting said auxiliary gears, said shifting assembly including a piston;

a single piece piston housing supported on said auxiliary gearbox, said single piece piston housing enclosing said piston on all sides thereof;

a sensor for monitoring selection of said auxiliary gears, said sensor being mounted on an outer surface of said single piece piston housing; and an air-pressure regulator mounted on said single piece piston housing through a threaded connection, said air-pressure regulator for supplying air to drive said shifting assembly.

2. A vehicle transmission assembly as recited in claim 1 wherein said shifting assembly includes a shift shaft.

3. A vehicle transmission assembly as recited in claim 2 wherein said auxiliary gear box is a range gear box, said piston is a range piston, said single piece piston housing is a range piston housing, and said auxiliary gears are selectively engageable high and low range gears.

4. A vehicle transmission assembly as recited in claim 3 wherein said sensor is concentric with said shift shaft.

5. A vehicle transmission assembly as recited in claim 3 including at least one solenoid located adjacent said air-pressure regulator and mounted to said range piston housing.

6. A range piston assembly comprising:

a piston and a single piece piston housing enclosing said piston on all sides thereof and supported by an auxiliary gear box assembly having a plurality of auxiliary gears including at least a high range gear and a low range gear;

an air-pressure regulator attached to said single piece housing through a threaded connection;

a sensor for monitoring selection of said auxiliary gears, said sensor for generating a first electronic signal when said high gear is selected and a second electronic signal when said low gear is selected, said sensor being mounted to an outer surface of said single piece piston housing; and at least one solenoid attached directly to said single piece housing for directing air to either of two sides of said piston.

7. A range piston assembly as recited in claim 6 wherein said air-pressure regulator supplies said air directed by said at least one solenoid to either of two sides of said piston.

8. A range piston assembly as recited in claim 6 wherein said at least one solenoid is a pair of solenoids attached directly to the housing.

9. A range piston assembly as recited in claim 6 including a shift shaft for actuating said high range and low range gears in said auxiliary gear box assembly.

10. A range piston assembly as recited in claim 9 wherein said sensor is concentric with said shift shaft.

11. A range piston assembly as recited in claim 10 wherein said auxiliary gears are range gears and said sensor transmits said signals to an electronic control unit.

12. A vehicle transmission assembly comprising:

a main gear box having a first shaft;

an auxiliary gear box assembly having a second shaft coupled to said first shaft;

auxiliary gears operably associated with said second shaft including selectively engageable high and low range gears;

a shifting assembly for shifting said high and low range gears;

a range piston assembly supported on said auxiliary gear box assembly and including a range piston, a single piece piston housing enclosing said range piston on all sides thereof, and a shift shaft operably connected to said shifting assembly;

a sensor mounted to said single piece piston housing for monitoring range selection of said auxiliary gears, said sensor being concentric with said shift shaft; and an air-pressure regulator attached to said single piece housing through a threaded connection, said air-pressure regulator for supplying air to drive said shifting assembly.

13. A vehicle transmission assembly as recited in claim 12 including a pair of solenoids attached directly to said single piece housing.

* * * * *